(12) United States Patent
Mathew (10) Patent No.: US 11,100,739 B1
(45) Date of Patent: Aug. 24, 2021

(54) TWO FACTOR IDENTIFICATION VERIFICATION OF CONTROLLED-ENVIRONMENT FACILITY RESIDENTS AND ASSOCIATED NON-RESIDENTS

(71) Applicant: Securus Technologies, Inc., Carrollton, TX (US)

(72) Inventor: Martin Mathew, Dallas, TX (US)

(73) Assignee: Securus Technologies, LLC, Carrollton, TX (US)

( * ) Notice: Subject to any disclaimer, the term of this patent is extended or adjusted under 35 U.S.C. 154(b) by 35 days.

(21) Appl. No.: 16/245,565

(22) Filed: Jan. 11, 2019

(51) Int. Cl.
*G07C 9/25* (2020.01)
*G07C 9/27* (2020.01)
*G10L 17/00* (2013.01)

(52) U.S. Cl.
CPC ............. *G07C 9/257* (2020.01); *G07C 9/253* (2020.01); *G07C 9/27* (2020.01); *G10L 17/00* (2013.01)

(58) Field of Classification Search
CPC .......... G07C 9/257; G07C 9/253; G07C 9/27; G10L 17/00
See application file for complete search history.

(56) References Cited

U.S. PATENT DOCUMENTS

| 7,039,224 B2 * | 5/2006 | Hamid | G06K 9/00046 382/124 |
| 9,020,114 B2 * | 4/2015 | Hogg, Jr. | H04M 3/42221 379/188 |
| 10,275,587 B2 * | 4/2019 | Cornick | G07C 9/28 |
| 2017/0364674 A1 * | 12/2017 | Grubbs | G06F 21/32 |

* cited by examiner

*Primary Examiner* — Daniell L Negron
(74) *Attorney, Agent, or Firm* — Fogarty LLP (57) ABSTRACT

Two factor identification verification of controlled-environment facility residents and associated non-residents systems and methods capture, via a controlled-environment facility associated communications device, by a controlled-environment facility communications processing system, a first type of biometric sample of a user. The controlled-environment facility communications processing system submits the first type of biometric sample of the user to a centralized investigative data aggregation and analysis system, which verifies the user using the first type of biometric sample and determining. When the system(s) determine that a certainty of this resulting verification of the user does not meet a predetermined certainty threshold a second type of biometric sample of the user is captured and submitted for verification of the user.

22 Claims, 3 Drawing Sheets

TWO FACTOR IDENTIFICATION VERIFICATION OF CONTROLLED-ENVIRONMENT FACILITY RESIDENTS AND ASSOCIATED NON-RESIDENTS

TECHNICAL FIELD

This specification is related to identification verification of residents of controlled-environment facilities, specifically to use of two-factor authentication to augment controlled-environment facility resident and associated non-resident identification verification with a second type of identification verification, and specifically to embodiments that, for example, use facial identification in addition to continuous voice verification and voice scoring to improve accuracy of identification verification of controlled-environment facility residents and associated non-residents.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Likewise, an inmate, or other controlled-environment facility resident, may wish to acquire commissary items, such as toiletries, bed linens, clothing, and food items. However, facilitating and administrating exchanges of information, money, goods, etcetera, with respect to a controlled environment facility, such in association with each of the foregoing examples, is often costly and time consuming and may present security and safety issues.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to, or otherwise sufficiently monitor, their own inmates. For example, often substantial controlled environment facility personnel (e.g., guard) time is expended in scheduling visitations, conducting background checks with respect to visitors, providing information regarding visitation times and rules, etcetera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide controlled-environment facility service user validation. To wit, a controlled-environment facility associated communications device captures a first type of biometric sample, such as the voice (or an image) of a user of the device, and a controlled-environment facility communications processing system submits this first type of biometric sample to a centralized investigative data aggregation and analysis system, which verifies the user using the first type of biometric sample. A determination is made, such as by the centralized investigative data aggregation and analysis system and/or the controlled-environment facility communications processing system, whether a certainty of the resulting verification of the user from the first type of biometric sample meets a predetermined certainty threshold. Upon a determination that the certainty of the verification of the user using the first type of biometric sample does not meet this certainty threshold, a second type of biometric sample of the user, such as an image (or the voice) of the user, is captured, via the controlled-environment facility associated communications device, for example, under direction of the controlled-environment facility communications processing system. This second type of biometric sample of the user, is then submitted to the centralized investigative data aggregation and analysis system, which verifies the user using the second type of biometric sample of the user. This may further include determining, by the centralized investigative data aggregation and analysis system and/or the controlled-environment facility communications processing system, whether identification of the user from the second type of biometric sample matches identification of the user using the first type of biometric sample.

The above may be initiated by the controlled-environment facility communications processing system receiving, prior to capturing of the first type of biometric sample of the user, a request from the user, via the controlled-environment facility associated communications device, for the controlled-environment facility service. Whereupon, the controlled-environment facility communications processing system, may request, via the controlled-environment facility associated communications device, identification credentials from the user. As such, the centralized investigative data aggregation and analysis system and/or the controlled-environment facility communications processing system, may also determine whether identification of the user from the second type of biometric sample matches the identification credentials of the user, in accordance with the above. Where the user is a resident of the controlled-environment facility, the identification credentials may include a Personal Identification Number (PIN) assigned to the resident, or the like.

In accordance with various of these systems and methods scoring identification of the user resulting from the first type of biometric sample of the user may be used. Therein, it may be determined whether a scoring of the identification using the first type of biometric sample meets a scoring threshold, and capture of the second type of biometric sample of the user may be carried out upon a determination that the scoring of the identification of the user using the first type of biometric sample does not meet this scoring threshold.

Where the first type of biometric sample is a voice sample and the second type of biometric sample is an image, verification of the user using the second type of biometric sample of the user comprises facial identification using facial recognition of the image of the user from an existing controlled-environment facility administration system database of images of controlled-environment facility residents or non-resident associated with one or more residents of the controlled-environment facility. Thus, where the user is a resident of the controlled-environment facility or a non-resident associated with a resident of the controlled-environment facility, a reference first type of biometric sample of the respective resident and/or respective non-resident and a reference second type of biometric sample of the respective resident and/or non-resident may be previously captured. The reference first type of biometric sample of the resident or non-resident and the reference second type of biometric sample of the resident or non-resident may be indexed with identification credentials of the respective resident or non-resident, at some time prior to initiation of the above identification verification.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Reliable identification of controlled-environment facility residents, such as correctional facility inmates, and non-residents with whom they interact, is desirable for both communications and commissary, as well as other controlled-environment facility processes such as making medical appointments, filing forms, including kites, grievances, criminal reports, etc. For example, it is important to identify (e.g. verify provided identification credentials) residents/ inmates placing calls to ensure they are not impersonating other residents/inmates and potentially using the account of the other resident's/inmate's information for nefarious purposes. Should an inmate manage to deceive the system, such as including hiding their identity, issues may arise not only with respect to using others' funds, but also with respect to witness and/or victim intimidation, evading call recordings that may be used against them in court or for other investigative purposes, etc.

Embodiments of the present systems and methods for two factor identification verification of controlled-environment facility residents and associated non-residents integrate provisions that may capture, via a controlled-environment facility associated communications device, by a controlled-environment facility communications processing system, a first type of biometric sample of a user. The controlled-environment facility communications processing system submits this first type of biometric sample of the user to a centralized investigative data aggregation and analysis system, which verifies the user using the first type of biometric sample. When the system(s) determine that a certainty of this resulting verification of the user does not meet a predetermined certainty threshold a second type of biometric sample of the user is captured and submitted for verification of the user. Thusly, the present systems and methods integrate such features into a new, practical, nonroutine, unconventional application for providing identification verification of residents of controlled-environment facilities. Specifically the present systems and methods may use two-factor authentication to augment controlled-environment facility resident and associated non-resident identification verification with a second type of identification verification. Particular embodiments may, for example, use facial identification in addition to continuous voice verification and voice scoring to improve accuracy of identification verification of controlled-environment facility residents and associated non-residents.

Thus, embodiments of the present systems and methods may use facial identification (i.e. use facial recognition to identify an individual from an existing database of individuals) to supplement continuous voice verification and/or voice recognition scoring to improve accuracy of voice verification provided by the continuous voice verification and/or voice recognition scoring, with respect to verifying (resident-provided or non-resident-provided) identification (credentials) of a resident or non-resident making use of or requesting use of controlled-environment facility services.

Continuous voice verification (or continuous voice recognition) can be used to ensure that only an approved controlled-environment facility resident (inmate) (and/or associated non-resident) of record is participating in a communication, and/or is requesting such a communication or other controlled-environment facility services. Communication monitoring may also analyze recordings utilizing periodic or continuous voice verification to identify situations where a communication has been illicitly joined, and/or where a controlled-environment facility service has been illicitly requested, by an individual that is not authorized to participate in the communication or make the request. If more certainty is needed embodiments of the present systems and methods may be employed.

Voice recognition scoring uses a percentage probability that a (suspected) resident's (inmate's) voice is heard on a call, or the like. These scores may be sorted highest to lowest, or the like. In an example, where one of two particular residents (inmates) are potentially heard on a call, one may, by way of example have a voice identification score of 69% and the other may have a voice identification score of 52%. Thus, the particular resident (inmate) on the call is more likely the resident (inmate) identified with a voice identification score of 69%. Due to the environmental issues typically associated with controlled-environment facility, such as the use of concrete construction of such facilities, such as, for example, prisons, jails or other correctional facilities, resident voice verification may not be as reliable as in other environments, such as due to the quality of captured voice samples due to echo effects, reverberation, and the like. If more certainty is needed embodiments of the present systems and methods may be employed.

Continuous voice verification and/or voice recognition scoring may not be as accurate as desired or called for in certain implementations, and these processes may rely on various metadata to improve accuracy. Facial identification may additionally, or alternatively, be used, in accordance with embodiments of the present systems and methods to improve the accuracy of voice verification using continuous voice verification and/or voice recognition scoring. In prior systems and methods continuous voice verification and/or voice recognition scoring, alone has been used to verify an actual call party, or other service requester. Use of continuous voice verification and/or voice recognition scoring may have a margin of error which leads to excessive false positive identifications. In accordance with embodiments of the present systems and methods, facial identification may be used to improve the accuracy of continuous voice verification and/or voice recognition scoring to correlate an actual caller or controlled-environment facility service requester with a PIN (Personal Identification Number), or other identification, which has been used to make the call and/or request the service.

Figure 1:
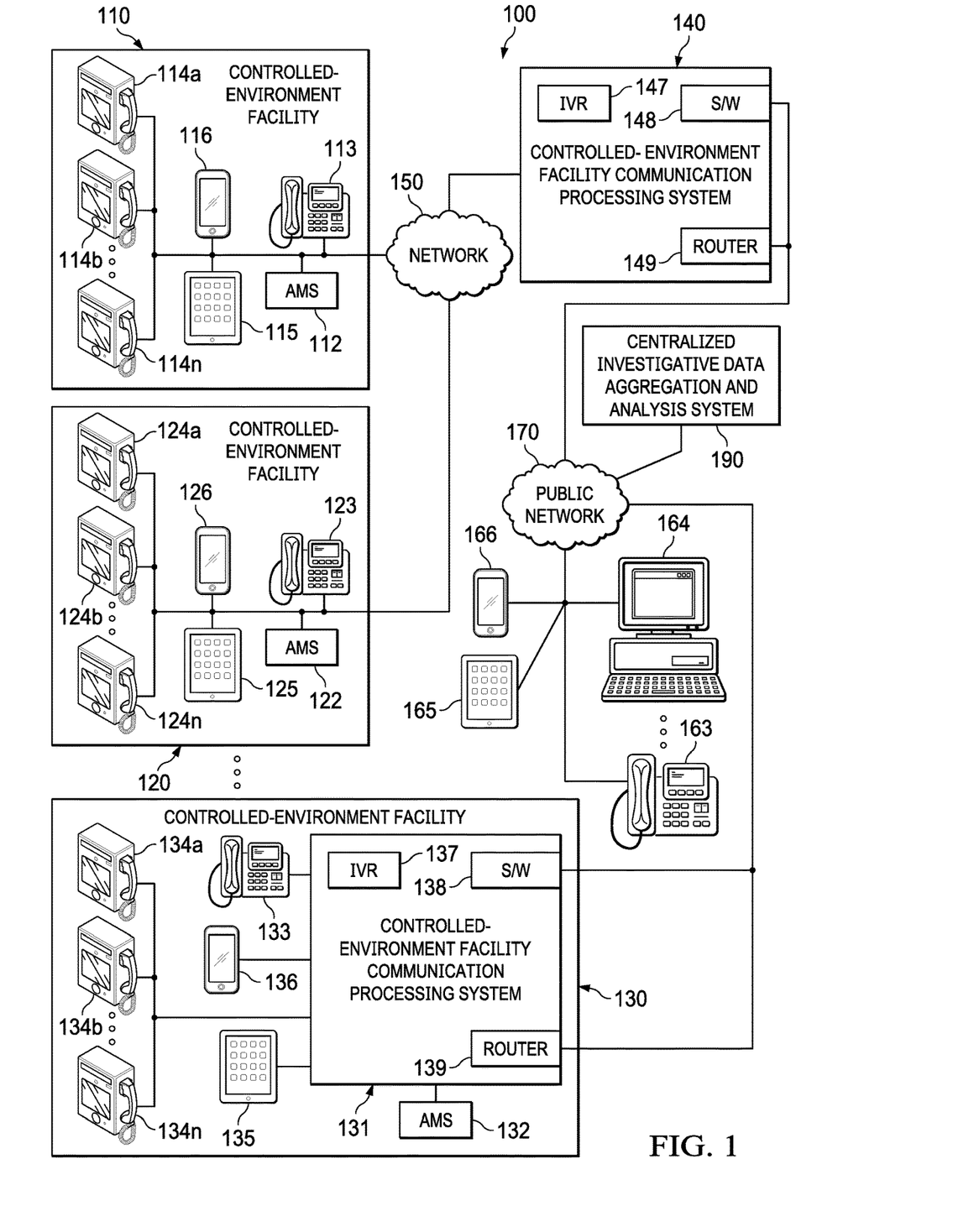
FIG. 1 is a diagrammatic illustration of an example communications environment, wherein an example embodiment of the present systems and methods for two factor identification verification of controlled-environment facility residents and associated non-residents may be deployed, for example with respect to multiple controlled-environment facilities and/or a single controlled-environment facility.

FIG. 1 is a diagrammatic illustration of example communications environment 100, wherein an example embodiment of the present systems and methods for two factor identification verification of controlled-environment facility residents and associated non-residents may be deployed, for example with respect to multiple controlled-environment facilities 110, 120, etc., and/or a single controlled-environment facility (130). Therein, onsite communication processing system 131, external centralized communication processing system 140, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated, a communication processing system (140), centrally or remotely located, in whole or in part, with respect to one or more controlled-environment facilities (110, 120, etc.), may be connected to such facilities via a public or private network (150) and provide communication services to such multiple controlled-environment facilities. More generally, however, it should be noted that communication systems 131, 140, etc. may assume a variety of forms, including telephony switches, such as electronic switching systems, or the like, and/or and may be configured to serve a variety of facilities and/or users, whether within or outside of a controlled-environment facility.

In some implementations, wherein the controlled-environment communication system (131) is located within the controlled-environment facility (130), it may have direct access to an Administration Management System (AMS) 132 (or a Jail Management System (JMS) in correctional environment embodiments) for garnering information used in accordance with various embodiments of the present systems and methods. In other embodiments, where the (central) controlled-environment facility communication system (140) is located remotely with respect to the controlled-environment facility (110, 120, etc.), access to AMS (or JMS) 112, 122, etc. may be obtained via a computer network such as, for example, network 150, for gathering information used in accordance with various embodiments of the present systems and methods.

In the context of a correctional facility, the respective JMS or AMS databases may also include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). Other management systems may include public phone companies, cell phone forensics, internet service providers, visitation systems including video and non-video systems, postal services, email services, payment processors and the like.

In addition to providing certain visitation and communication operations, communication processing systems 131 and 140 may attempt to ensure that a resident's calls, video conferences, online chats, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 112, 122 or 132, or the like. In addition to PAN or PAC list(s), AMS (or JMS) 112, 122 or 132 (databases), or the like, may also store inmate or resident profile data (RPD), as well as visitation rules applicable to each inmate or resident, Communication Detail Records (CDRs), or similar records, for resident phone calls, video visitations, texts, online chats, or the like.

Residents may use more-or-less conventional telephones 113, 123, 133, or the like to access certain communication services, under control of respective communication processing system 131, 140, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use a video visitation device 114a through 114n, 124a through 124n, 134a through 134n, or the like, to place voice calls, as well as for video visitation, under control of respective communication processing system 131, 140, etc. Such a video visitation device may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what applications programs (apps) are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

To access communications services, a resident may initiate telephone services by lifting the receiver on telephone 113, 123, 133, etc. or IFD 114, 124, 134, etc. and/or otherwise initiating a call, such as by launching an applications program (app) on IRD 115, 125, 135, 116, 126, 136, etc. At which time, the resident may be prompted to provide a PIN, other identifying information or biometrics. In accordance with embodiments of the present systems and methods such biometric data may include the voice of the resident, an image of the resident, or the like. Interactive voice response (IVR) unit 137 or 147, which may be integrated into communications processing system 131 or 140, as illustrated, may generate and play a prompt or other messages to the resident. Under the control of communication processing system 131 and/or 140, etc. the device may be capable of connecting to a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 148, 138, etc. in respective communication processing system 131, 140, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 149, 139, etc., media gateway functionality, or the like of respective communication system 131, 140, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

In accordance with various embodiments of the present systems and methods, a controlled-environment communication apparatus that may carry out capture communications data may take the form of central and/or onsite controlled-environment facility communication management system 140 and/or 131, respectively.

In accordance with embodiments of the present systems and methods the present two factor identification verification of controlled-environment facility residents and associated non-residents may employ the controlled-environment facility communications management systems (131 and 140) associated with at least one controlled-environment facility (110, 120 or 130) and/or a centralized investigative data aggregation and analysis system (190). Controlled-environment facility communications management systems 131 and 140 may, in accordance with embodiments of the present systems and methods, capture data related to communications and/or controlled-environment facility services requests associated with each resident of each controlled-environment facility and provide identifying information or biometrics, such as the voice, an image, or the like of the resident or other service or communication requester, such as to centralized investigative data aggregation and analysis system 190. Centralized investigative data aggregation and analysis system 190, and/or in accordance with various embodiments of the present systems and methods controlled-environment facility communications management systems 131 and/or 140, may direct a respective controlled-environment facility associated communications device (i.e. controlled-environment facility communications device (113, 114, 115, 116, 123, 124, 125, 126, 133, 134, 135, 136) and/or non-resident communications device (163, 164, 165, 166)) to capture a first type of biometric sample (e.g. voice sample(s)) of a user of the device (resident or non-resident). Controlled-environment facility communications processing system 131, 140 submits this first type of biometric sample (e.g. voice sample(s)) of the user to centralized investigative data aggregation and analysis system 190, if it is not submitted by the respective controlled-environment facility communications device (113, 114, 115, 116, 123, 124, 125, 126, 133, 134, 135, 136) and/or non-resident communications device (163, 164, 165, 166), directly.

Centralized investigative data aggregation and analysis system 190 may then identify, or otherwise verify, the user, employing this first type of biometric sample (voice sample(s)) of the user. Controlled-environment facility communications processing system 131, 140, and/or centralized investigative data aggregation and analysis system 190, may determine whether a certainty of the resulting identification of the user from the first type of biometric sample (voice sample(s)) meets a predetermined certainty threshold (e.g. an identification (voice) score). Such a voice score may be based, at least in part, on a voice biometric analysis derived percentage probability that a particular individual's voice was recognized by the centralized investigative data aggregation and analysis system.

Upon a determination that the certainty (identification (voice) score) of the identification of the user using the first type of biometric sample (voice sample(s)) does not meet the predetermined certainty threshold, controlled-environment facility communications processing system 131, 140 may instruct respective controlled-environment facility resident communications device (113, 114, 115, 116, 123, 124, 125, 126, 133, 134, 135, 136) and/or camera enabled non-resident communications device (163, 164, 165, 166) to capture a second type of biometric sample (e.g. image(s)) of the user and submit the second type of biometric sample (image(s)) of the user, to centralized investigative data aggregation and analysis system 190 if it is not submitted directly by the respective controlled-environment facility communications device (113, 114, 115, 116, 123, 124, 125, 126, 133, 134, 135, 136) and/or non-resident communications device (163, 164, 165, 166).

Centralized investigative data aggregation and analysis system 190 may then identify, or otherwise verify, the user using the second type of biometric sample (image(s)) of the user. This may be carried out using "facial identification" using facial recognition on the image(s) of the user, employing an existing controlled-environment facility AMS 112, 122, 132 database of images of controlled-environment facility residents or non-residents associated in the database with one or more residents.

Hence, to implement embodiments of the present systems and methods system "training" may take place at an earlier time, such as at the time of intake (booking) of the resident (inmate) or at the time a non-resident registers to communicate with the resident. This training may involve capturing a "reference" first type of biometric sample of the respective resident and/or respective non-resident (i.e. one or more reference voice samples read from a prepared script and/or candidly captured) and capturing a reference second type of biometric sample of the respective resident and/or non-resident (i.e. one or more reference images, covertly and/or overtly captured). These reference samples may then be indexed with one another and/or with identification credentials of the respective resident or non-resident, such as in a respective database of controlled-environment facility administration system 112, 122, 132, and/or a database of centralized investigative data aggregation and analysis system 190. Centralized investigative data aggregation and analysis system 190 and/or controlled-environment facility communications processing system 131, 140 may also determine whether identification verification of the user from the first (voice) and/or second (image) type of biometric sample(s) match, and/or match identification credentials, such as a PIN, provided by the resident or non-resident to initiate the call or other controlled-environment facility service, in accordance with embodiments of the present systems and methods. Thereby, to, by way of example, identify PIN sharing activities, otherwise thoroughly validate a user, or the like, centralized investigative data aggregation and analysis system 190 may, in accordance with embodiments of the present systems and methods use voice biometric analysis, augmented by facial identification.

Figure 2:
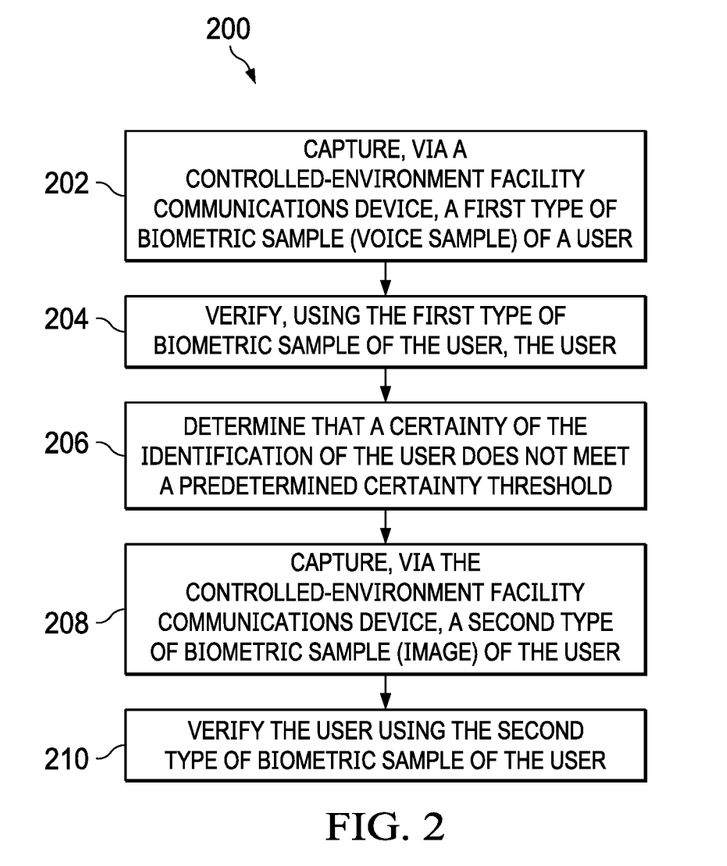
FIG. 2 is a flowchart of an example process for two factor identification verification of controlled-environment facility residents and associated non-residents, in accordance with some embodiments.

FIG. 2 is a flowchart of example process 200 for two factor identification verification of controlled-environment facility residents and associated non-residents, in accordance with some embodiments of the present systems and methods. Therein, validation of a resident or non-resident user of a controlled-environment facility service may include capturing, at 202, a first type of biometric sample of a user (e.g. one or more voice samples, or the like), via a controlled-environment facility associated communications device (i.e. controlled-environment facility communications device (113, 114, 115, 116, 123, 124, 125, 126, 133, 134, 135, 136) and/or non-resident communications device (163, 164, 165, 166)), at direction of and by a controlled-environment facility communications processing system (131, 140). As noted, the user in question may be a resident of the controlled-environment facility or a non-resident associated with the resident of the controlled-environment facility and the controlled-environment facility service may be a communication between the resident and the non-resident. As also noted, this first type of biometric sample may be a voice sample and a second type of biometric sample may be is an image. Conversely, the first type of biometric sample may be an image and the second type of biometric sample may be a voice sample. The first type of biometric sample of the user may be submitted by the controlled-environment facility communications processing system (131, 140), or may be provided directly to, a centralized investigative data aggregation and analysis system (190).

In certain embodiments of the present systems and methods, the controlled-environment facility communications processing system (131, 140) may, prior to capturing of the first type of biometric sample of the user at 202, receive a request, or the like from the user, such as via the controlled-environment facility communications device or a non-resident communications-enabled device, for a controlled-environment facility service, such as to initiate a communication between a resident of the controlled-environment facility and a non-resident, such as described above. In such embodiments, the controlled-environment facility communications processing system, may, via respective controlled-environment facility communications device or camera-enabled non-resident communications device, prior to capturing of the first type of biometric sample of the user at 202, request from the user, identification credentials from the user, such as also described above. Resultingly, the controlled-environment facility communications processing system, receives the identification credentials from the user, also prior to capturing of the first type of biometric sample of the user at 202. In embodiments where the user is a resident of the controlled-environment facility (110, 120, 130), the identification credentials may be a PIN assigned to the resident.

The centralized investigative data aggregation and analysis system (190) identifies, or otherwise verifies, the user using the first type of biometric sample of the user, at 204. At 206, the centralized investigative data aggregation and analysis system (190) and/or the controlled-environment facility communications processing system (131, 140) determines whether a certainty of the resulting identification verification of the user from the first type of biometric sample meets a predetermined certainty threshold. Where the certainty of the verification of the user using the first type of biometric sample does not meet this predetermined certainty threshold at 206, the controlled-environment facility communications device (113, 114, 115, 116, 123, 124, 125, 126, 133, 134, 135, 136) or camera-enabled non-resident communications device (163, 164, 165, 166), may, at 208, may, such as at the direction of the respective controlled-environment facility communications processing system (131, 140), capture a second type of biometric sample (e.g. one or more images, or the like) of the user. This second type of biometric sample of the user is then submitted by the controlled-environment facility communications processing system (131, 140) to the centralized investigative data aggregation and analysis system (190).

At 210, the centralized investigative data aggregation and analysis system (190), may then identify, or otherwise verify, the user using the second type of biometric sample (image(s)) of the user. In accordance with embodiments of the present systems and methods, this may further include the centralized investigative data aggregation and analysis system and/or the controlled-environment facility communications processing system (131, 140), determining whether the resulting identification verification of the user from the second type of biometric sample (e.g. image of the user, or the like) matches the identification of the user, using the first type of biometric sample (e.g. voice sample of the user).

In embodiments where a user's identification credentials are received prior to capturing the first type of biometric (voice) sample of the user at 202, a determination may be made, such as following identification of the user using the second type of biometric sample (image) of the user at 210, by the centralized investigative data aggregation and analysis system (190) and/or the controlled-environment facility communications processing system (131, 140), whether the resulting identification of the user from the second type of biometric sample (image) matches the identification credentials of the user.

In embodiments where the first type of biometric sample is one or more voice samples from the user and the second type of biometric sample is one or more images of the user, identifying, or otherwise verifying the identity of, the user using the second type of biometric sample (i.e. image(s)) of the user may employ facial identification. As noted, such "facial identification" may use facial recognition of the image(s) of the user employing an existing controlled-environment facility administration system (112, 122, 132) database of images of controlled-environment facility residents and non-resident associated with one or more residents of the controlled-environment facility in the database.

Accordingly, such as where the user is a resident of the controlled-environment facility and/or a non-resident associated with a resident of the controlled-environment facility, reference biometrics may be gathered prior to a first use of the controlled-environment facility service, and hence, prior capturing the sample of the first type of biometric at 202. For example, a reference first type of biometric (voice) sample of the respective resident and/or respective non-resident and a reference second type of biometric sample (image) of the respective resident and/or non-resident may be captured, at some time prior to a first use of the controlled-environment facility service, and hence some time prior to capturing the sample of the first type of biometric at 202. Accordingly, the reference first type of biometric (voice) sample of the resident or non-resident and the reference second type of biometric sample (image) of the resident or non-resident may be indexed with identification credentials of the respective resident or non-resident, also at some time prior to a first use of the controlled-environment facility service, and hence some time prior to capturing the sample of the first type of biometric at 202.

Figure 3:
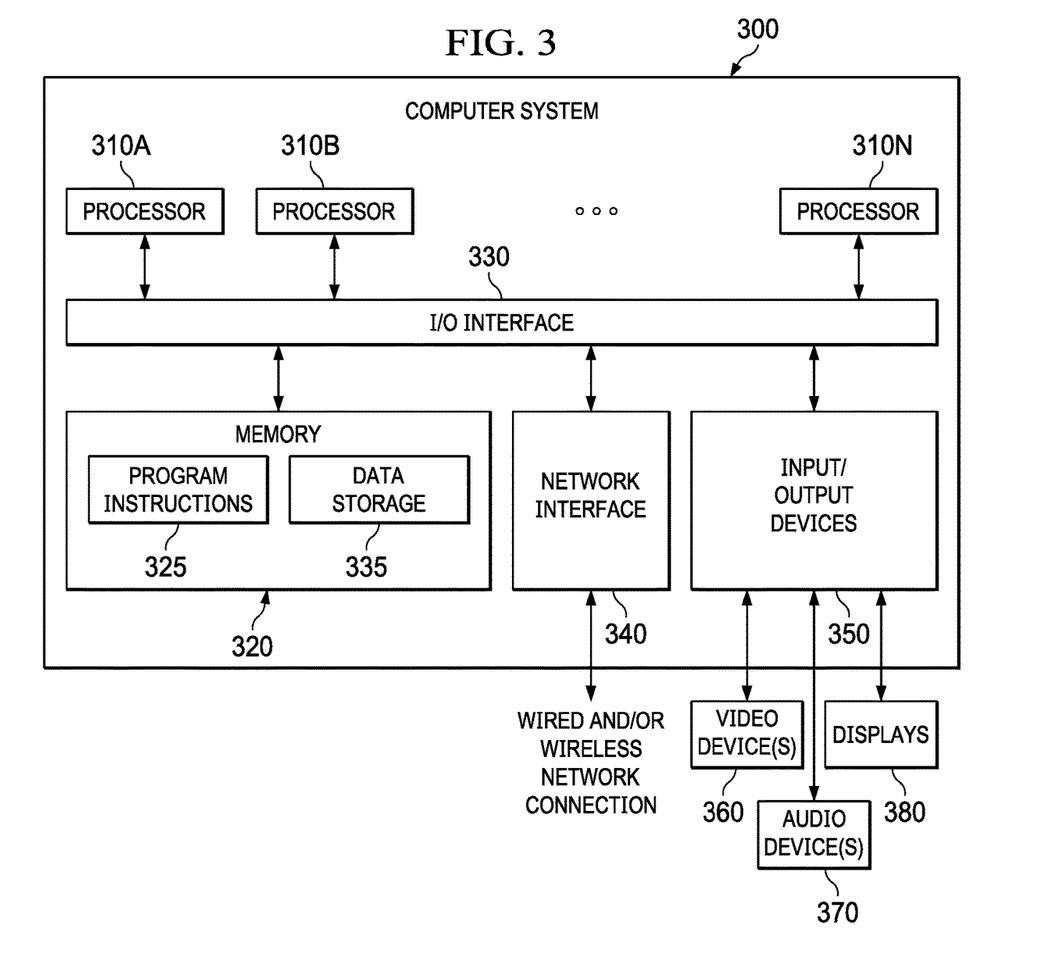
FIG. 3 is a block diagram of a computer system, device, station, or terminal configured to implement various techniques disclosed herein, according to some embodiments.

Embodiments of the present systems and methods for two factor identification verification of controlled-environment facility residents and associated non-residents, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2, and/or a computer system such as computer system 300 may be used as part of, one or more of: controlled environment facility communications management systems 131 and/or 140; AMSs 112, 122 and 132; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, centralized investigative data aggregation and analysis system 190 is illustrated as communicating with controlled-environment facility communications management systems 131 and 140, via public network 170, which may be the Internet, or the like, as discussed above. Further, users of the present investigative data aggregation and analysis system may communicate therewith via public network 170 (e.g. the Internet) or the like.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310).

In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility service user validation system comprising:
at least one controlled-environment facility associated communications device each comprising:
at least one processor; and
a memory coupled to the processor, the memory having program instructions stored thereon that, upon execution by the processor, cause the controlled-environment facility associated communications device to, at the direction of a controlled-environment facility communications processing system:
capture a first type of biometric sample of a user of the controlled-environment facility associated communications device; and
capture a second type of biometric sample of the user;
the controlled-environment facility communications processing system comprising:
at least one processor; and
a memory coupled to the processor, the memory having program instructions stored thereon that, upon execution by the processor, cause the controlled-environment facility communications processing system to:
instruct a respective controlled-environment facility associated communications device to capture the first type of biometric sample of the user of the respective controlled-environment facility associated communications device;
submit the first type of biometric sample of the user to a centralized investigative data aggregation and analysis system;
instruct the respective controlled-environment facility associated communications device to capture the second type of biometric sample of the user upon a determination that the certainty of the identification of the user using the first type of biometric sample does not meet a predetermined certainty threshold, by the centralized investigative data aggregation and analysis system; and
submit the second type of biometric sample of the user, to the centralized investigative data aggregation and analysis system; and
the centralized investigative data aggregation and analysis system comprising:
at least one processor; and
a memory coupled to the processor, the memory having program instructions stored thereon that, upon execution by the processor, cause the centralized investigative data aggregation and analysis system to verify the user using the first type of biometric sample of the user;
the controlled-environment facility communications processing system program instructions cause the controlled-environment facility communications processing system to determine that the certainty of the resulting verification of the user from the first type of biometric sample does not meet the predetermined certainty threshold; and
the centralized investigative data aggregation and analysis system program instructions cause the centralized investigative data aggregation and analysis system to verify the user using the second type of biometric sample of the user.

2. The system of claim 1, wherein:
the first type of biometric sample is a voice sample and the second type of biometric sample is an image; or
the first type of biometric sample is an image and the second type of biometric sample is a voice sample.

3. The system of claim 1, wherein the first type of biometric sample is a voice sample and the second type of biometric sample is an image.

4. The system of claim 1, wherein verifying the user using the second type of biometric sample of the user comprises facial identification using facial recognition of the image of the user from an existing controlled-environment facility administration system database of images of controlled-environment facility residents or non-resident associated with one or more residents of the controlled-environment facility.

5. The system of claim 1, wherein the user is a resident of the controlled-environment facility or a non-resident associated with the resident of the controlled-environment facility and the controlled-environment facility service is a communication between the resident and the non-resident.

6. The system of claim 1, wherein the user is a resident of the controlled-environment facility or a non-resident associated with a resident of the controlled-environment facility, and the method further comprises capturing a reference first type of biometric sample of the respective resident and/or respective non-resident and a reference second type of biometric sample of the respective resident and/or non-resident and indexing the reference first type of biometric sample of the resident or non-resident and the reference second type of biometric sample of the resident or non-resident with the identification credentials of the respective resident or non-resident, at some time prior to a first use of the controlled-environment facility service.

7. The system of claim 1 wherein the centralized investigative data aggregation and analysis system and/or the controlled-environment facility communications processing system further determines whether the resulting verification of the user from the second type of biometric sample matches the verification of the user using the first type of biometric sample.

8. The system of claim 1, wherein:
the controlled-environment facility communications processing system, prior to capture of the first type of biometric sample of the user:
receives a request from the user, via the respective controlled-environment facility associated communications device, for the controlled-environment facility service;
requests, via the controlled-environment facility associated communications device, identification credentials from the user;
receive the identification credentials from the user; and
determine whether the resulting verification of the user from the second type of biometric sample matches the identification credentials of the user.

9. The system of claim 8, wherein the user is a resident of the controlled-environment facility and the identification credentials comprise, at least, a personal identification number assigned to the resident.

10. The system of claim 1, wherein the centralized investigative data aggregation and analysis system scores an identification of the user resulting from the first type of biometric sample of the user.

11. The system of claim 10, wherein:
the centralized investigative data aggregation and analysis system determines whether a certainty of the resulting verification of the user meets the predetermined certainty threshold, by determining whether a resulting scoring of identification using the first type of biometric sample meets a scoring threshold; and
the controlled-environment facility communications processing system instructs the respective controlled-environment facility associated communications device to capture the second type of biometric sample of the user upon a resulting determination that the scoring of identification of the user using the first type of biometric sample does not meet the predetermined scoring threshold.

12. A method for validation of a user of a controlled-environment facility communication service comprising:
capturing, via a controlled-environment facility associated communications device, at the direction of a controlled-environment facility communications processing system, a first type of biometric sample of a controlled-environment facility resident user or a non-resident user, associated with the controlled-environment facility resident;
submitting, by the controlled-environment facility communications processing system, the first type of biometric sample of the user to a centralized investigative data aggregation and analysis system;
verifying, by the centralized investigative data aggregation and analysis system, the user using the first type of biometric sample of the user;
determining, by the centralized investigative data aggregation and analysis system and/or the controlled-environment facility communications processing system, that a certainty of the resulting verification of the user from the first type of biometric sample does not meet a predetermined certainty threshold;
capturing, via the controlled-environment facility associated communications device, at the direction of the controlled-environment facility communications processing system, a second type of biometric sample of the user upon a resulting determination that the certainty of the verification of the user using the first type of biometric sample does not meet the predetermined certainty threshold;
submitting, by the controlled-environment facility communications processing system, the second type of biometric sample of the user, to the centralized investigative data aggregation and analysis system; and
verifying, by the centralized investigative data aggregation and analysis system, the user using the second type of biometric sample of the user.

13. The method of claim 12, further comprising determining, by the centralized investigative data aggregation and analysis system and/or the controlled-environment facility communications processing system, whether identification of the user from the second type of biometric sample matches identification of the user using the first type of biometric sample.

14. The method of claim 12, further comprising:
receiving, by the controlled-environment facility communications processing system, prior to capturing of the first type of biometric sample of the user, a request from the user, via the controlled-environment facility associated communications device, for the controlled-environment facility service;

requesting, by the controlled-environment facility communications processing system, via the controlled-environment facility associated communications device, prior to capturing of the first type of biometric sample of the user, a request from the user, identification credentials from the user;
receiving, by the controlled-environment facility communications processing system, prior to capturing of the first type of biometric sample of the user, the identification credentials from the user; and
determining, by the centralized investigative data aggregation and analysis system and/or the controlled-environment facility communications processing system, whether identification of the user from the second type of biometric sample matches the identification credentials of the user.

15. The method of claim 14, wherein the user is a resident of the controlled-environment facility and the identification credentials comprise, at least, a personal identification number assigned to the resident.

16. The method of claim 12, further comprising scoring identification of the user resulting from the first type of biometric sample of the user.

17. The method of claim 16, wherein:
determining whether a certainty of the resulting identification of the user meets the predetermined certainty threshold, further comprises determining whether a resulting scoring of the identification using the first type of biometric sample meets a scoring threshold; and
capturing the second type of biometric sample of the user is carried out upon a resulting determination that the scoring of the identification of the user using the first type of biometric sample does not meet the predetermined scoring threshold.

18. The method of claim 12, wherein:
the first type of biometric sample is a voice sample and the second type of biometric sample is an image; or
the first type of biometric sample is an image and the second type of biometric sample is a voice sample.

19. The method of claim 12, wherein the first type of biometric sample is a voice sample and the second type of biometric sample is an image.

20. The method of claim 19, wherein verifying the user using the second type of biometric sample of the user comprises facial identification using facial recognition of the image of the user from an existing controlled-environment facility administration system database of images of controlled-environment facility residents or non-resident associated with one or more residents of the controlled-environment facility.

21. The method of claim 12, wherein the user is a resident of the controlled-environment facility or a non-resident associated with a resident of the controlled-environment facility, and the method further comprises capturing a reference first type of biometric sample of a respective resident and/or respective non-resident and a reference second type of biometric sample of the respective resident and/or non-resident and indexing the reference first type of biometric sample of the resident or non-resident and the reference second type of biometric sample of the resident or non-resident with the identification credentials of the respective resident or non-resident, at some time prior to a first use of the controlled-environment facility service.

22. A computer readable non-transitory medium having program instructions stored thereon that upon execution by a controlled-environment facility communications processing system and/or a centralized investigative data aggregation and analysis system, cause the controlled-environment facility communications processing system and/or the centralized investigative data aggregation and analysis system to:

capture, via a controlled-environment facility associated communications device, a first type of biometric sample of a controlled-environment facility resident user or a non-resident user, associated with the controlled-environment facility resident, of a controlled-environment facility communication service;

verify, using the first type of biometric sample of the user, the user;

determine that a certainty of the resulting identification of the user from the first type of biometric sample does not meet a predetermined certainty threshold;

capture, via the controlled-environment facility associated communications device, a second type of biometric sample of the user upon a resulting determination that the certainty of the identification of the user using the first type of biometric sample does not meet the predetermined certainty threshold; and     verify the user using the second type of biometric sample of the user.

\* \* \* \* \*